(12) United States Patent
Bärgman et al.

(10) Patent No.: US 8,346,463 B2
(45) Date of Patent: Jan. 1, 2013

(54) DRIVING AID SYSTEM AND METHOD OF CREATING A MODEL OF SURROUNDINGS OF A VEHICLE

(75) Inventors: Jonas Bärgman, Göteborg (SE); Jan-Erik Källhammer, Linköping (SE)

(73) Assignee: Autoliv Development AB, Vargarda (SE)

( * ) Notice: Subject to any disclaimer, the term of this patent is extended or adjusted under 35 U.S.C. 154(b) by 718 days.

(21) Appl. No.: 12/280,605

(22) PCT Filed: Mar. 9, 2007

(86) PCT No.: PCT/SE2007/000224
§ 371 (c)(1),
(2), (4) Date: Aug. 25, 2008

(87) PCT Pub. No.: WO2007/114753
PCT Pub. Date: Oct. 11, 2007

(65) Prior Publication Data
US 2009/0005959 A1    Jan. 1, 2009

(30) Foreign Application Priority Data

Apr. 3, 2006 (GB) .................................. 0606785.4

(51) Int. Cl.
*G06G 7/70* (2006.01)
*G06G 7/76* (2006.01)
(52) U.S. Cl. ........................................ 701/117; 701/448
(58) Field of Classification Search .................. 701/117, 701/216, 26, 118, 119, 400, 408, 409, 413, 701/414, 446, 447, 448, 450, 469, 300; 340/901, 340/905, 988, 995.19, 995.22, 995.24; 345/501, 345/522; 382/103, 104
See application file for complete search history.

(56) References Cited

U.S. PATENT DOCUMENTS

| | | | | |
|---|---|---|---|---|
| 7,804,424 | B2 * | 9/2010 | Iwane | ........................... 340/916 |
| 2005/0002558 | A1 | 1/2005 | Franke et al. | |
| 2005/0131626 | A1 * | 6/2005 | Ignatin | ......................... 701/117 |

FOREIGN PATENT DOCUMENTS

| | | |
|---|---|---|
| DE | 19505487 A1 | 9/1995 |
| EP | 0 740 163 A | 4/1996 |
| JP | 9166452 A | 6/1997 |
| JP | 09178505 A | 7/1997 |
| JP | 11271074 | 10/1999 |
| JP | 2000097714 A | 4/2000 |
| JP | 2003279363 A | 10/2003 |
| JP | 2004045051 A | 2/2004 |
| JP | 2004233220 A | 8/2004 |

* cited by examiner

*Primary Examiner* — Mark Beauchaine
(74) *Attorney, Agent, or Firm* — Brinks Hofer Gilson & Lione

(57) ABSTRACT

In at least one embodiment of the present invention a driving aid system for mounting in a road vehicle is provided. The driving aid system comprises a detection system for detecting and storing profiles of characteristics of objects around the vehicle along a road on which the vehicle is being driven. A positioning system is for providing a current position of the vehicle. Profiles of characteristics of objects are stored in relation to the detected position of the vehicle. A processing arrangement compares currently detected profiles with earlier stored profiles and, if a match between a currently detected profile and an earlier stored profile is found, then the current position of the vehicle is determined relative to an object corresponding to the earlier stored profile, and the same or other earlier stored profiles is used to predict the future surroundings of the vehicle.

23 Claims, 4 Drawing Sheets

DRIVING AID SYSTEM AND METHOD OF CREATING A MODEL OF SURROUNDINGS OF A VEHICLE

CROSS REFERENCE TO RELATED APPLICATIONS

This application claims priority to PCT patent application WO 2007/114753, filed Mar. 9, 2007 and GB patent application 0606785.4, filed Apr. 3, 2006.

FIELD OF THE INVENTION

This invention relates to a driving aid system and in particular, to a driving aid system to be mounted in a road vehicle for increased vehicle safety and accuracy in determining the position of the vehicle.

BACKGROUND OF THE INVENTION

For road vehicles such as cars, it is known to provide a navigation system (such as GPS) which, along with stored map data, may give information regarding speed limits, intersections, traffic lights and so forth, so that the driver can be warned when it is determined that the vehicle may encounter a hazardous situation. It is also known to use "dead reckoning" to determine the current position of the vehicle relative to an earlier known position, if, for example, a GPS signal is lost (such a system may use accelerometers, gyroscopes and/or wheel rotation sensors to track the movements of the vehicle). It will be appreciated, however, that the further the vehicle progresses from the last known position, the degree of accuracy with which the position of the vehicle can be determined will steadily reduce.

SUMMARY OF THE INVENTION

In at least one embodiment of the present invention, an improved system for determining the position of the vehicle, and also for alerting the driver of the vehicle to potential hazards is provided.

One embodiment of the present invention provides a driving aid system mounted in a road vehicle and includes a detection system for detecting and storing profiles of characteristics of objects around the vehicle along a road on which the vehicle is being driven. A positioning system includes dead reckoning and is for providing a current position of the vehicle with profiles of characteristics of objects being stored in relation to the detected position of the vehicle. A processing arrangement is for comparing currently detected profiles with earlier stored profiles. If a match between a currently detected profile and an earlier stored profile is found, then the current position of the vehicle relative to an object corresponding to the earlier stored profile is determined and the same or other earlier stored profiles to predict the future surroundings of the vehicle are used.

Another embodiment of the present invention provides a driving aid system mounted in a road vehicle and includes a detection system for detecting and storing profiles of characteristics of objects around the vehicle along a road on which the vehicle is being driven. A positioning system is for providing a current position of the vehicle with profiles of characteristics of objects being stored in relation to the detected position of the vehicle. A processing arrangement is for comparing currently detected profiles with earlier stored profiles. If a match between a currently detected profile and an earlier stored profile is found, then the current position of the vehicle relative to an object corresponding to the earlier stored profile is determined and the same or other earlier stored profiles to predict the future surroundings of the vehicle are used. The processing arrangement also analyzes the speed and direction of movement of moving objects detected by the detection system.

Advantageously, the driving aid system may be operable to determine whether a detected moving object is a vehicle or a pedestrian, and storing the position and/or the movement path of the moving object.

Preferably, the driving aid system is operable to inform a driver of the vehicle if a pedestrian is detected in a location that is determined to be unusual.

Conveniently, the driving aid system may be operable to inform a driver of the vehicle if the detected behaviour of a pedestrian is determined to be unusual, with regard to the location of the pedestrian.

Advantageously, the frequency or intensity of detected moving objects along a movement path may be stored.

Preferably, the driving aid system is operable to identify areas of high pedestrian activity.

Another embodiment of the present invention provides a driving aid system mounted in a road vehicle and includes a detection system for detecting and storing profiles of characteristics of objects around the vehicle along a road on which the vehicle is being driven. A positioning system is for providing a current position of the vehicle with profiles of characteristics of objects being stored in relation to the detected position of the vehicle. A processing arrangement is for comparing currently detected profiles with earlier stored profiles. If a match between a currently detected profile and an earlier stored profile is found, then the current position of the vehicle relative to an object corresponding to the earlier stored profile is determined and the same or other earlier stored profiles to predict the future surroundings of the vehicle are used. The detection system also only stores profiles relating to objects that appear to be fixed in position.

Yet another embodiment of the present invention provides a driving aid system mounted in a road vehicle and includes a detection system for detecting and storing profiles of characteristics of objects around the vehicle along a road on which the vehicle is being driven. A positioning system is for providing a current position of the vehicle. The positioning system includes dead reckoning profiles of characteristics of objects being stored in relation to the detected position of the vehicle. A processing arrangement is for comparing currently detected profiles with earlier stored profiles. If a match between a currently detected profile and an earlier stored profile is found, then the current position of the vehicle relative to an object corresponding to the earlier stored profile is determined and the same or other earlier stored profiles to predict the future surroundings of the vehicle are used. Profiles relating to defects along driving paths along which the vehicle has not travelled for a predetermined time or distance are also deleted.

Conveniently, the positioning system may comprise GPS or dead reckoning.

Advantageously, the positioning system may comprise GPS and dead reckoning.

Preferably, if no GPS signal is received by the positioning system, the positioning system may use dead reckoning until a GPS signal is next received.

Conveniently, the detection system may comprise a sensor arrangement for remotely sensing locations of objects relative to the vehicle.

Advantageously, the detection system may further comprise processing means for extracting simplified features of the objects to provide said profiles, the simplified features of the objects being added to a model of the surroundings of the vehicle.

Preferably, allowable driving paths are determined from detected movement of the vehicle and/or other vehicles.

Conveniently, when a match between a currently detected profile and an earlier stored profile is found, the stored profile of the object may be enhanced and/or updated using the currently detected profile.

Advantageously, the driving aid system may be operable to identify complex traffic areas.

Preferably, profiles are only stored if they fall within areas classified as complex traffic areas.

Conveniently, the driving aid system may be operable to identify certain complex traffic areas as intersections.

Advantageously, intersections may be classified as falling into one or more intersection classifications.

Preferably, intersections are classified by comparing profiles of fixed and/or moving objects against one or more pre-stored intersection templates.

Conveniently, the driving aid system may be operable to classify at least one type of intersection as the vehicle approaches the intersection, in the absence of any previously stored profiles or data relating to the intersection.

Advantageously, the classification of an intersection may be used to provide an indication to a driver of the vehicle as to where the driver should look while approaching and/or negotiating the intersection.

Preferably, profiles are only stored if they fall within an areas that is determined to contain an intersection.

Conveniently, at least some areas of high pedestrian activity or complex traffic areas may be associated with times during which the areas are most busy.

Advantageously, profiles relating to objects that are not present every time the vehicle passes the location in which the object was previously detected may be deleted.

Preferably, the process of comparing earlier stored profiles with currently-detected profiles is initially conducted by comparing profiles relating to objects closest to the vehicle.

Conveniently, the detection system may be operable to make an initial determination of the current position of the vehicle when the vehicle approaches an area containing one or more objects in respect of which profiles have been stored, and wherein the position of the vehicle relative to one or more objects in respect of which profiles are stored is determined when a match between a currently detected profile and a stored profile is made.

Advantageously, the driving aid system may be operable to make a determination that a hazardous situation may occur or is likely to occur, and to activate one or more vehicle safety systems in response to the making of such a determination.

Preferably, the manner in which one or more vehicle safety systems is activated is varied in dependence upon information provided by the driving aid system.

Conveniently, activation of the vehicle safety systems may cause a warning to be presented to the driver.

Advantageously, activation of the vehicle safety system may cause emergency braking of the vehicle to be initiated, and/or a seat belt pretensioner to be activated.

Preferably, the position of the vehicle relative to a stored map is determined, with the position of the vehicle relative to said map being corrected and/or updated when a match between a stored profile and a currently-detected profile is made.

One embodiment of the present invention provides a method of creating a model of surroundings of a vehicle including detecting and storing profiles of characteristics and objects around the vehicle along a road on which the vehicle is being driven. A current position of the vehicle is provided using a positioning system with profiles of characteristics of objects being stored in relation to the detected position of the vehicle. Currently detected profiles with earlier stored profiles are compared and if a match between a currently detected profile and an earlier profile is found, then the current position of the vehicle relative to an object corresponding to the earlier stored profile is determined and the same or other earlier stored profiles to predict the future surroundings of the vehicle are used. The positioning system also comprises dead reckoning.

Another embodiment of the present invention provides a method of creating a model of surroundings of a vehicle including detecting and storing profiles of characteristics and objects around the vehicle along a road on which the vehicle is being driven. A current position of the vehicle is provided using a positioning system with profiles of characteristics of objects being stored in relation to the detected position of the vehicle. Currently detected profiles with earlier stored profiles are compared and if a match between a currently detected profile and an earlier profile is found, then the current position of the vehicle relative to an object corresponding to the earlier stored profile is determined and the same or other earlier stored profiles to predict the future surroundings of the vehicle are used. The speed and direction of detected moving objects is also used in the analysis.

Yet another embodiment of the present invention provides a method of creating a model of surroundings of a vehicle including detecting and storing profiles of characteristics and objects around the vehicle along a road on which the vehicle is being driven. A current position of the vehicle is provided using a positioning system with profiles of characteristics of objects being stored in relation to the detected position of the vehicle. Currently detected profiles with earlier stored profiles are compared and if a match between a currently detected profile and an earlier profile is found, then the current position of the vehicle relative to an object corresponding to the earlier stored profile is determined and the same or other earlier stored profiles to predict the future surroundings of the vehicle is used. Also, the profiles that are stored relate only to objects that appear to be fixed in position.

Another embodiment of the present invention provides a method of creating a model of surroundings of a vehicle including detecting and storing profiles of characteristics and objects around the vehicle along a road on which the vehicle is being driven. A current position of the vehicle is provided using a positioning system with profiles of characteristics of objects being stored in relation to the detected position of the vehicle. Currently detected profiles with earlier stored profiles are compared and if a match between a currently detected profile and an earlier profile is found, then the current position of the vehicle relative to an object corresponding to the earlier stored profile is determined, and the same or other earlier stored profiles to predict the future surroundings of the vehicle are used. Also, the profiles relating to objects along driving paths along which the vehicle has not travelled for a predetermined time or distance are deleted.

Conveniently, the method may further comprise the steps of determining that a hazardous situation may occur or is likely to occur and activating one or more vehicle safety systems in response to the making of such a determination.

A further aspect of the present invention provides a computer program comprising computer program code operable to perform all of the steps of the above when said program is run on a computer.

Another aspect of the present invention provides a computer program according to the above, embodied on a computer readable medium.

BRIEF DESCRIPTION OF THE DRAWINGS

In order that the present invention may be more readily understood, embodiments thereof will now be described, by way of example, with reference to the accompanying drawings, in which.

DETAILED DESCRIPTION

Figure 1:
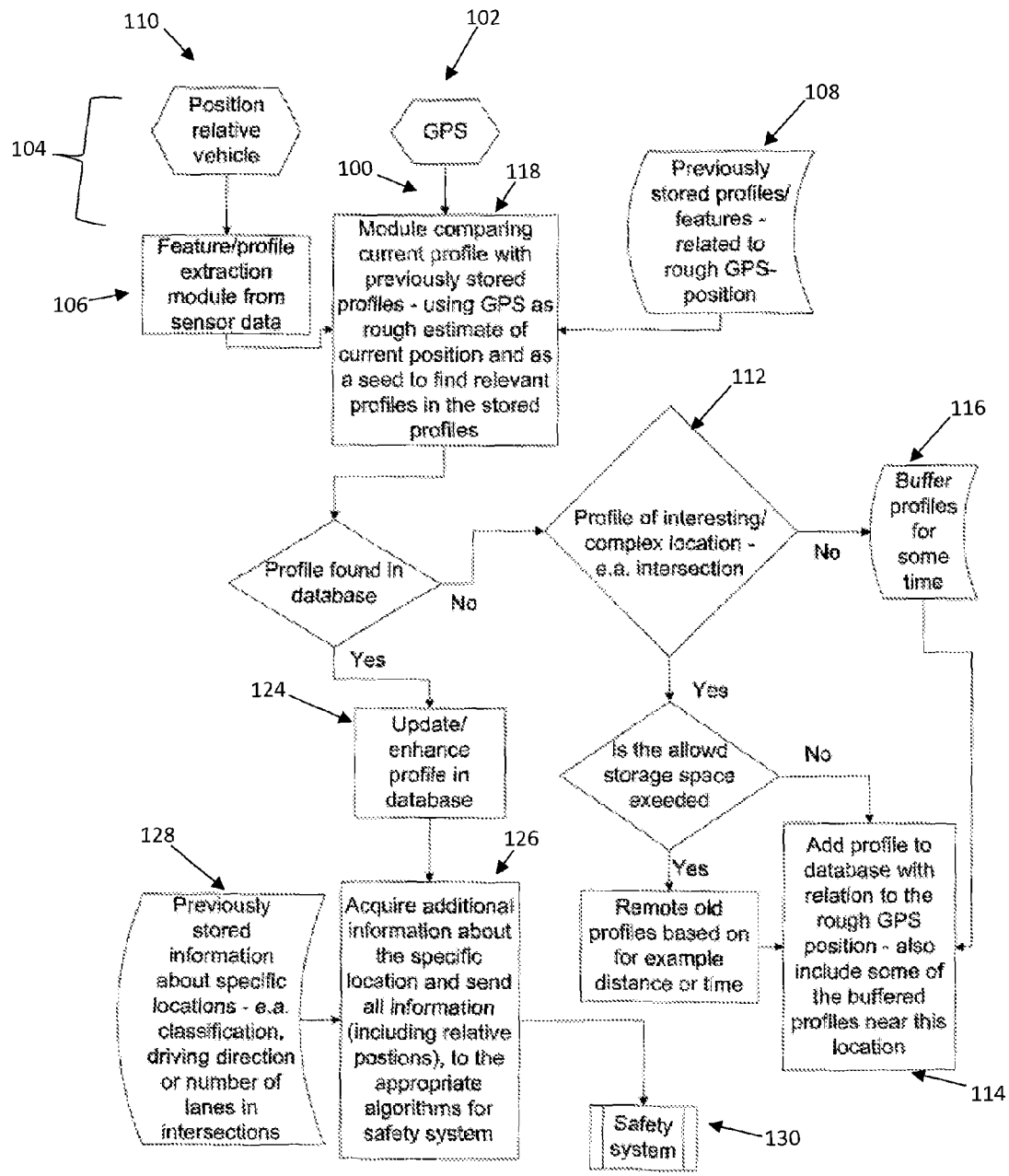
FIG. 1 is a flow chart showing steps carried out by a driving aid system embodying the present invention.

A driving aid system embodying the present invention is mounted inside a road vehicle, for instance a car. The driving aid system comprises a detection system, which is operable to detect and store profiles of characteristics of objects around the vehicle, along a road on which the vehicle is being driven. The detection system is preferably able to detect profiles of characteristics of objects around the vehicle remotely and may, for example, comprise a horizontally scanning laser radar, which measures the time taken for an emitted laser signal to return and, combined with the direction of return of the emitted signal, determines information regarding characteristics (such as position, shape, size and direction and speed of travel) of an object from which the signal has been reflected. Any suitable detection system may be used, and it is envisaged that the present invention may also function with conventional radar, optical or ultrasonic systems.

A memory (which may be a part of the detection system) is provided to allow detected profiles of characteristics of objects around the vehicle to be stored and subsequently accessed.

The driving aid system further comprises a positioning system for providing a current position (100) of the vehicle. An example of such positioning system is the Global Positioning System (GPS) (102), although any other suitable positioning system may be used.

Use of a driving aid system embodiment of the present invention will now be described.

As a vehicle in which the driving aid system is mounted is driven along a road, the detection system (104) detects profiles (106) of characteristics of objects around the vehicle, as described above. Processes for determining the characteristics of the surrounding objects from the data received by the detection system (104) are known, and will not be discussed in this specification.

The profiles (106) of characteristics of objects around the vehicle are stored, and when they are stored the profiles (108) are associated or tagged with an absolute position, which is determined by calculating the position of the object relative (110) to the vehicle, and from the position (100) of the vehicle as determined by the positioning system. In this way, it will be appreciated that, as a vehicle containing the driving aid system is driven between various locations, profiles relating to objects around the driving path of the vehicle will be detected (112) and stored (114). Profiles may be buffered (116) for a certain length of time before being stored (114), to allow a decision to be taken as to whether they should indeed be stored. For instance (as discussed in more detail below) storage may only be required if the object in question forms part of an intersection or other area of interest and on first detection of an object it may not be clear whether this is the case. Buffering (116) profiles allow time for an appropriate determination to be made, so that the profile can be correctly stored (114) or discarded.

If the vehicle is driven along a driving path along which it has already been driven on one or more previous occasions, then profiles of characteristics of objects along the driving path may have already been detected and stored in the memory. As the vehicle progresses, the driving aid system retrieves the stored profiles (108) of objects that were detected during the one or more previous journeys, and attempts to match profiles (106) detected (112) by the detection system (104) to the profiles (108) that have already been stored, by comparing (118) the detected position (100) and/or other characteristics of surrounding objects with the stored profiles (108). In doing so, the driving aid system uses the currently determined position (100) of the vehicle as a starting point, and from the absolute position data that is associated with the previously-stored profiles (108), makes a determination as to where the previously-detected objects should be relative to the position of the vehicle. Initially, the driving aid system may attempt to find matches relating to objects closest to the vehicle for which profiles have been previously stored.

If the detection system (104) detects characteristics of a nearby object that matches stored characteristics from one or more previous journeys, the driving aid system may make a match between the stored profile (108) and the currently detected profile (106), and proceed to update (124) and/or enhance the profile of the object in the database using the newly-acquired data from the detection system (104). It will be appreciated that detecting the characteristics of an object in this manner on more than one occasion will improve the accuracy with which the object's characteristics (e.g. size, position and shape) may be determined (126).

It will also be appreciated that, if an object is detected during one journey but not detected during another, it may be determined that the object is not a permanent feature, and the object may therefore be removed from the memory. For instance, a parked car and a lamp post may be detected during a first journey on a driving path, and on a subsequent journey the car may not be detected (because it has been moved), whereas the lamp post will be detected as before. In this case, the profile corresponding to the parked car will be removed from the memory, whereas the profile of the lamp post will be retained, and may be updated and/or enhanced using the newly-acquired data.

Amongst the fixed objects, the driving aid system may determine the positions of possible driving paths (e.g. roads), and also retain this information (128). The position of driving paths may be determined, for example, by keeping a record of the routes along which the vehicle is driven, and also by detecting and noting the movement of other vehicles. In such embodiments of the invention, the detection system (104) is provided with an algorithm that is able to distinguish another road vehicle from other types of objects, and any route along which a road vehicle is seen to travel, or along which a predetermined number of vehicles are seen to travel, may be designated as a possible driving path.

If a sufficient number of passes are made along a particular road, and other road vehicles are encountered, the driving aid system may be able to determine the number of lanes that are provided on a particular road, and also the direction of permitted travel of road vehicles along each lane.

The driving aid system may also be operable to identify regions having consistently heavy traffic activity, or where the detected directions of travel of the vehicle and of other road vehicles vary in such a way that it may be determined that that region comprises complex traffic area, which may be a road intersection. For instance, if, on a particular driving path, the detected directions of travel of the vehicle and of other road vehicles comprise only travel in one direction and travel in a substantially opposite direction, it might reasonably be determined that this driving path comprises a straight stretch of road, with no intersection or side branching. However, if it is determined that the vehicle sometimes passes along a particular driving path in a first direction, but on other occasions passes across the driving path in a direction which is substantially at right angles to the first direction, or if other road vehicles are observed travelling across the driving path in a direction which is substantially at right angles to the first direction, then it may be determined that the region in question comprises a junction or intersection.

In embodiments of the present invention, the driving aid system is able to identify and store the positions of junctions and/or intersections, or other regions in which the movement of the traffic is determined to be heavy or complex.

The driving aid system may also be operable to classify the type of junction or intersection that has been detected, for instance a cross-junction, a T-junction, a flyover and so on. It is envisaged that this may be achieved by storing "template" characteristics of different types of junctions and intersections, and classify a junction or intersection according to template characteristics that are most accurately matched by the observed traffic behaviour. The junctions or intersections may also be classified with respect to the positions of fixed objects in conjunction with the traffic behaviour, for instance the number of lanes in different directions and physical features such as traffic lights, as well as associated driving behaviour.

On approaching a new junction or intersection for the first time, the driving aid system may be operable to classify the junction or intersection before the arrival of the vehicle at the junction or intersection. In this case, the driving aid system may be in a position to take an appropriate action, such as for instance the activation of the vehicle safety system (130) (see below for a more detailed discussion), as appropriate for the type of junction or intersection and/or detected moving or stationary objects.

The driving aid system may also be provided with one or more algorithms allowing the driving system to determine whether a detected object is likely to be a pedestrian. From the detected behaviour (e.g. positions and directions of travel) of pedestrians, the driving aid system may be able to determine the positions of pedestrian routes around driving paths, such as for instance pavements, paths, pedestrian crossings, traffic lights, and so on. Features where many pedestrians are detected may once again be classified by the driving aid system, and again it is envisaged that this may be done by comparing pedestrian behaviour to one or more stored templates, each of which corresponds to a particular type of pedestrian feature. The driving aid system may also identify pedestrian features as being busy, if a high amount of pedestrian activity is detected on one occasion or is consistently detected. On approaching such areas, the driver may be given a warning, and threshold levels for certain safety systems (e.g. emergency braking) may be altered, particularly to make the safety systems more sensitive.

Regions designated as junctions, intersections, areas of high pedestrian activity and so on may also be associated with times at which this activity is greatest. For instance, the driving aid system may identify that there is high pedestrian activity outside a school at certain hours of the day, and on weekdays (as opposed to weekends). Warnings may therefore be given to the driver of the vehicle as it approaches the school at the appropriate time, or on an appropriate day, but not at other times. Similarly, the driving aid system may determine that an intersection is busy at certain times (e.g. during morning and evening rush hours) but is seen as significantly less busy at other times.

Also, if a pedestrian is detected in an unusual place, or where pedestrians have never or seldom been detected before, or if the detected behaviour of a pedestrian is determined to be unusual (particularly considering the location of the pedestrian), the driver may be warned of this. In embodiments of the invention, information regarding pedestrians (and indeed regarding other moving or stationary objects) may be received from other vehicle subsystems, such as one or more video or infrared cameras.

It is also envisaged that previously-stored profiles may be used to determine the current position of the vehicle with greater accuracy. If, for example, a particular object has been detected several times, the driving aid system may store the position of the object with a high degree of accuracy (it is envisaged that the accuracy may be to within less than 0.1 meters). In contrast, at any given moment the position of the vehicle may be known only to a relatively low degree of accuracy from the positioning system (typically greater than 0.1 metres). In addition, if a signal required to determine the position of the vehicle has been lost, then the vehicle may be attempting to keep a track of the current position using dead reckoning, and, as discussed above, the accuracy with which the current position can be determined by this method rapidly decreases with time and distance travelled. It will be appreciated that such a stored map contains different information to that contained in the model built up by the driving aid system, but it is envisaged that there will be sufficient features in common for such matches to be made.

If, however, the vehicle is able to detect the position, relative to itself, of an object whose position is stored with a high degree of accuracy in the memory, then the vehicle will be able to determine its current position accurately. If a driving aid system is able to make an accurate determination of this nature, then the current position of the vehicle, as determined by the positioning system may be updated, and a correction made for any offset that may be present between the current position as determined by the positioning system and the actual position of the vehicle. The position of the vehicle on a stored map may also be updated or corrected using this method, in particular by relating the stored profiles to features present on the map. It will be appreciated that such a stored map will contain different information to that contained in the model built up by the driving aid system, but it is envisaged that there will be sufficient features in common for such matches to be made.

It will be appreciated that, if the vehicle is driven over large distances, the quantity of data that must be stored to maintain an accurate set of profiles for objects surrounding the driving paths will be very large. In embodiments of the present invention, the creation of maps of detected objects, intersections and so on is concentrated on driving paths along which the vehicle is driven frequently. This has the benefit of concentrating the memory resources on such areas, and therefore, on locations in which the vehicle is most likely to encounter a hazardous situation.

In such embodiments of the invention, stored profiles relating to driving paths along or through which the vehicle has not been driven for a predetermined time (for instance one month or one year) or distance (for instance 1,000, 10,000 or 20,000 km) may be deleted from the memory. Profiles along a driving path may be retained for a longer time if the vehicle has passed along the driving path more than a predetermined number of times. The driving aid system may additionally retain in memory for a longer time profiles relating to locations which may present hazardous situations, for instance intersections or pedestrian features. Indeed, in some embodiments the driving aid system may retain only profiles relating to intersections and/or locations determined to be "complex" traffic areas, or otherwise areas of potential hazard. If the available storage memory becomes full, then the "oldest" profiles may be deleted as and when storage space is required for the storage of new data, for instance relating to a new complex traffic area that has been identified.

In use of the driving aid system, the driving aid system uses the current position of the vehicle as determined by the positioning system and/or by matches with previously-stored profiles, and (taking into account the direction of travel of the vehicle) predicts the future surroundings of the vehicle, by extrapolating the motion of the vehicle and thus determining which objects, intersections, etc. will be encountered.

The driving aid system preferably uses one or more algorithms to determine whether the vehicle is likely to encounter a hazardous situation, and to activate one or more appropriate safety system of the vehicle if such a determination is made.

For instance, if the driving aid system determines that the vehicle is being driven towards an intersection which is often busy, a warning may be presented to the driver of the vehicle, and this warning may include information regarding the classification of the intersection, and/or information regarding the usual rate of traffic at the intersection, and/or indicate to the driver where the driver should look when approaching and negotiating the intersection to notice potential hazards. In some embodiments, the warning may only be presented or a relatively strong warning may be presented when it is determined that the speed and/or direction of travel of the vehicle on approaching the intersection are such that action will need to be taken swiftly if the intersection is to approached and/or negotiated safely.

If it appears necessary, information regarding the position of the vehicle may be transmitted to other vehicles, or via a communications network to an external location.

In extreme examples, if the speed and/or direction of travel of the vehicle as the intersection is approached are such that a hazardous situation appears to be likely, further vehicle safety systems may be automatically activated such as emergency braking, brake assist, steering assist, steering avoidance, a reversible seat belt pretensioner and/or other safety devices.

The determination as to whether the vehicle has encountered or is likely to encounter, a hazardous situation, may be made not only from the position and speed of the vehicle, but may also be made in response to the detection of non-permanent moving or non-moving objections. For instance, although a driver may be negotiating an intersection in an appropriate manner, the presence of an unusual fixed object (for instance a large object which is lying on the road) or unusual moving objections (for instance another vehicle which is driving hazardously, or a pedestrian who is, for some reason, standing on the road) may lead the system to determine that a potential hazardous situation may arise, or indeed has arisen.

In further embodiments of the invention, the driving aid system predicts the future surroundings of the vehicle over only a short distance, for example around 100 m-400 m. It is appreciated that this will reduce the burden on the processing capabilities of the driving aid system. In advantageous embodiments of the invention, the distance over which the future surroundings of the vehicle is predicted is varied in dependence upon the speed with which the vehicle is travelling.

Figure 2:
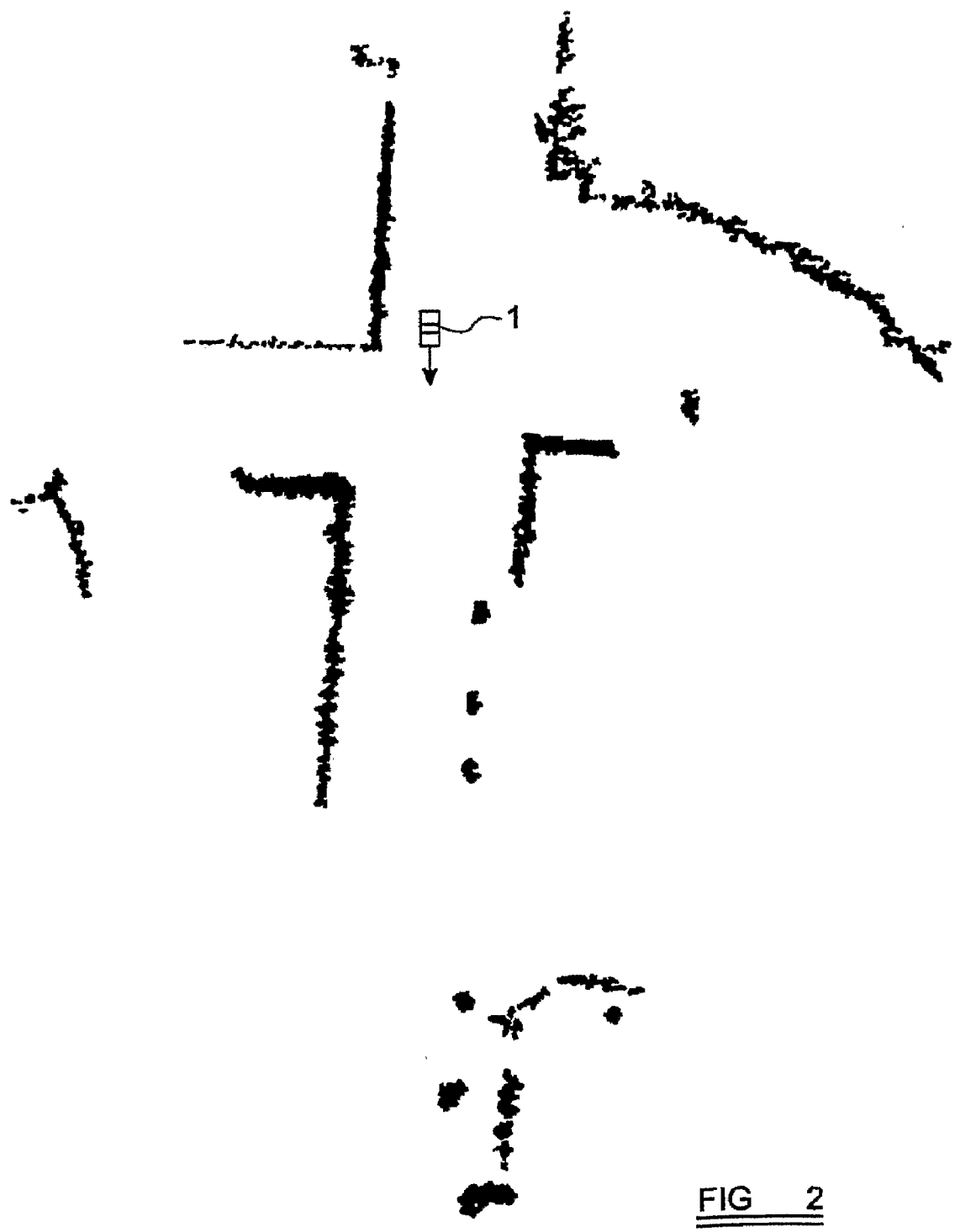
FIGS. 2 and 3 show primary and secondary profiles respectively, created by a driving aid system embodying the present invention, of an area through which a vehicle containing the driving aid system is progressing.

With reference to FIG. 2, a vehicle 1 is shown, travelling through an environment in which no data has been stored by the driving aid system. Shown around the vehicle 1 are "primary profiles" of regions from which it appears that signals emitted by the detection system have been reflected and returned.

Figure 3:
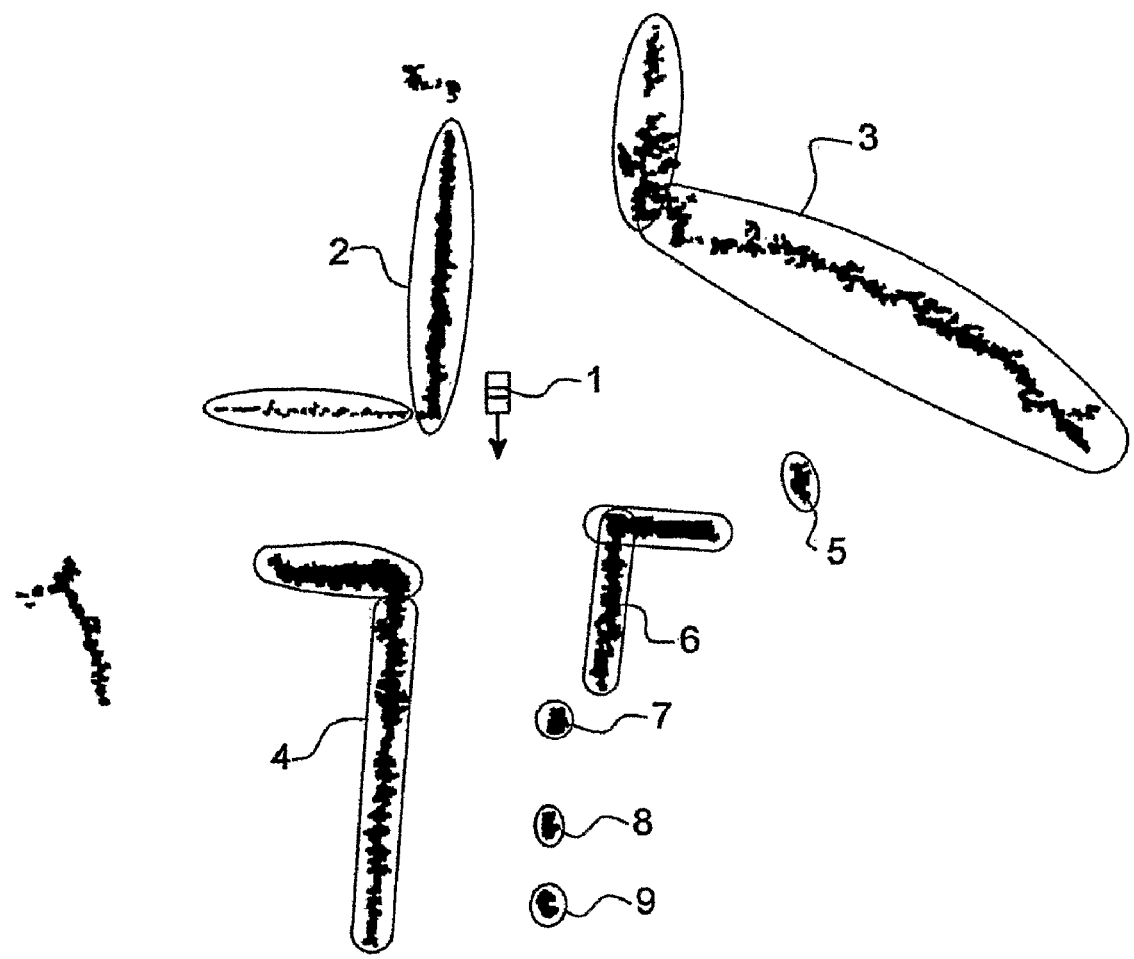

As shown in FIG. 3, the primary profiles are then used to create "secondary" profiles of objects 2 to 9, which has been determined to be present around the vehicle.

Figure 4:
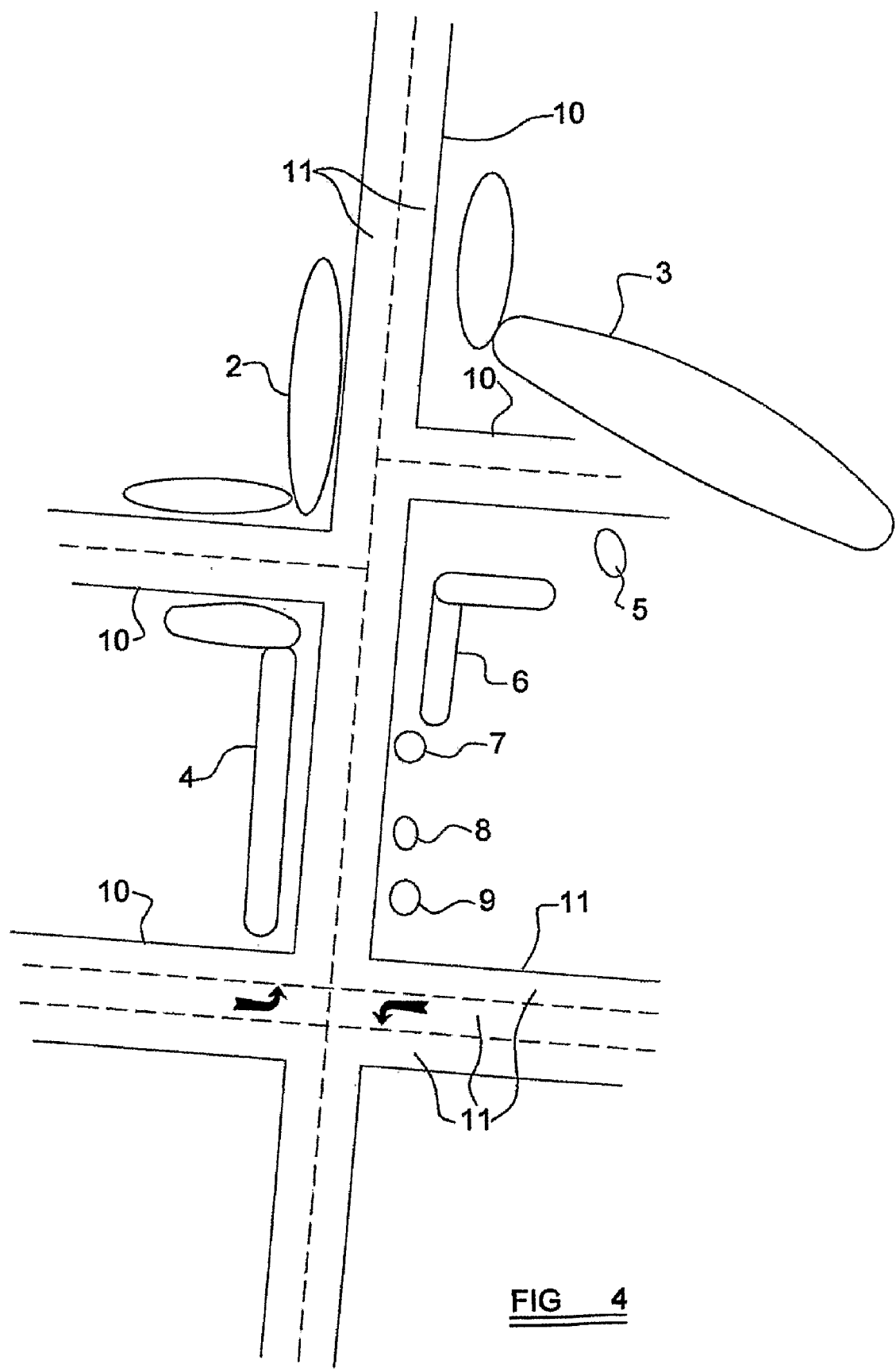
FIG. 4 shows a model produced by a driving aid system embodying the present invention.

Turning also to FIG. 4, after several passes through the environment, the driving aid system may build up a stored model of the environment, which includes the locations of the roads 10 as allowable driving paths (along with the number of lanes at each point along the road, and the permitted direction of travel in each lane) as well as fixed objects which appear between the driving paths. When driving through this environment again, the distance between the vehicle 1 and each of the known objects may be determined, as well as the position of the vehicle 1 relative to the roads 10, and the lanes 11 within the roads 10. The driving aid system is then able to determine whether the vehicle 1 is travelling in an appropriate direction with regard to the lane 11 in which the vehicle 1 is currently travelling, whether the vehicle 1 is on a collision course of any of the fixed objects 2-9 or whether the vehicle 1 is approaching a junction, intersection or pedestrian feature, as discussed above. The driving aid's model of the surroundings may, as indicated above, also use information from other vehicle subsystems, such as one or more video cameras and/or infrared cameras, particularly for detecting and analysing the behaviour of moving objects, e.g. pedestrians. If a determination is made that a hazardous situation may be or is likely to occur, appropriate safety measures (as discussed above) may be taken.

If safety systems such as emergency braking, emergency steering and deployment of an air-bag are activated, then the manner of the activation may depend upon the information gathered by the driving aid system. For instance, the severity of the emergency braking or the direction of the emergency steering may be determined by the locations of moving and/or stationary objects detected whilst negotiating an intersection. As a further example, thresholds for the activation of safety systems (e.g. detected distance to a stationary object) may be raised or lowered, or indeed certain safety systems may be activated or deactivated, depending on the information provided by the driving aid system.

It will be appreciated that embodiments of the present invention may improve the overall level of safety when driving a vehicle, and also allow more accurate determination of the position of the vehicle.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

The invention claimed is:
1. A driving aid system for a road vehicle comprising:
 a detection system for detecting and storing profiles of characteristics of objects around the vehicle along a road on which the vehicle is being driven;
 a positioning system for providing a current position of the vehicle to define a detected position of the vehicle, the profiles of characteristics of objects being stored in relation to the detected position of the vehicle; and a processing arrangement for comparing the profiles of characteristics of objects including currently detected profiles with earlier stored profiles and, if a match between one of the currently detected profiles and one of the earlier stored profiles is found, determining the current position of the vehicle relative to an object corresponding to the earlier stored profile, and using the one or another of the earlier stored profiles to predict future surroundings of the vehicle, wherein when a match between the currently detected profile and the earlier stored profile is found, the earlier stored profile of the object is at least one of enhanced and updated using the currently detected profile, wherein profiles relating to objects that are not present every time the vehicle passes the location in which the object was previously detected are deleted.

2. A driving aid system according to claim 1, wherein the processing arrangement analyzes speed and direction of movement of moving objects detected by the detection system.

3. A driving aid system according to claim 2, wherein the driving aid system is operably configured to determine whether a detected moving object is a vehicle or a pedestrian, and storing at least one of a position and a movement path of the moving object.

4. A driving aid system according to claim 3, wherein the driving aid system is operably configured to inform a driver of the vehicle if a pedestrian is detected in a location that is determined to be unusual.

5. A driving aid system according to claim 4, wherein the driving aid system is operably configured to inform the driver of the vehicle if detected behaviour of the pedestrian is determined to be unusual with regard to location of the pedestrian.

6. A driving aid system according to claim 3, wherein one of frequency and intensity of the detected moving object along the movement path is stored.

7. A driving aid system according to claim 6, wherein the driving aid system is operably configured to identify areas of high pedestrian activity.

8. A driving aid system according to claim 1, wherein the detection system only stores profiles relating to objects that appear to be fixed in position.

9. A driving aid system according to claim 1, wherein profiles relating to defects along driving paths along which the vehicle has not travelled for one of a predetermined time and distance are deleted.

10. A driving aid system according to claim 1, wherein the positioning system comprises one of GPS and dead reckoning.

11. A driving aid system according to claim 1, wherein the detection system further comprises processing means for extracting simplified features of objects to provide the profiles of characteristics of objects, the simplified features of the objects being added to a model of the surroundings of the vehicle.

12. A driving aid system according to claim 1, wherein allowable driving paths are determined from detected movement of at least one of the vehicle and other vehicles.

13. A driving aid system according to claim 1, wherein the driving aid system is operably configured to identify certain complex traffic areas as intersections.

14. A driving aid system according to claim 1, wherein the detection system is operable to make an initial determination of the current position of the vehicle when the vehicle approaches an area containing one or more objects in respect of which profiles have been stored, and wherein the position of the vehicle relative to the one or more objects in respect of which profiles have been stored is determined when the match between the currently detected profile and the stored profile is made.

15. A driving aid system according to claim 1, wherein the driver aid system is operably configured to make a determination that a hazardous situation is likely to occur, and to activate one or more vehicle safety systems in response to making the determination.

16. A driving aid system according to claim 1, wherein the current position of the vehicle relative to a stored map is determined, with the current position of the vehicle relative to the stored map being at least one of corrected and updated when the match between the stored profile and the currently detected profile is made.

17. A driving aid system according to claim 1, wherein the profile includes size of the object.

18. A driving aid system according to claim 1, wherein the profile includes shape of the object.

19. A driving aid system for a road vehicle comprising:
a detection system for detecting and storing profiles of characteristics of objects around the vehicle along a road on which the vehicle is being driven;
a positioning system for providing a current position of the vehicle to define a detected position of the vehicle, the profiles of characteristics of objects being stored in relation to the detected position of the vehicle; and
a processing arrangement for comparing the profiles of characteristics of objects including currently detected profiles with earlier stored profiles and, if a match between one of the currently detected profiles and one of the earlier stored profiles is found, determining the current position of the vehicle relative to an object corresponding to the earlier stored profile, and using the one or another of the earlier stored profiles to predict future surroundings of the vehicle, wherein when a match between the currently detected profile and the earlier stored profile is found, the earlier stored profile of the object is at least one of enhanced and updated using the currently detected profile, certain objects being identified as intersections, wherein the intersections are classified as falling into at least one intersection classification, the intersections being classified according to template characteristics that match traffic behavior.

20. A driving aid system according to claim 19, wherein the classification of the intersection is used to provide an indication to a driver of the vehicle as to where the driver should look while at least one of approaching and negotiating the intersection.

21. A driving aid system according to claim 19, wherein the intersections are classified according to template characteristics that match traffic behavior and the positions of fixed objects.

22. A driving aid system according to claim 20, wherein the intersections are classified according to the number of lanes in different directions.

23. A driving aid system for a road vehicle comprising:
a detection system for detecting and storing profiles of characteristics of objects around the vehicle along a road on which the vehicle is being driven;
a positioning system for providing a current position of the vehicle to define a detected position of the vehicle, the profiles of characteristics of objects being stored in relation to the detected position of the vehicle; and
a processing arrangement for comparing the profiles of characteristics of objects including currently detected profiles with earlier stored profiles and, if a match between one of the currently detected profiles and one of the earlier stored profiles is found, determining the current position of the vehicle relative to an object corresponding to the earlier stored profile, and using the one or another of the earlier stored profiles to predict future surroundings of the vehicle, wherein when a match between the currently detected profile and the earlier stored profile is found, the earlier stored profile of the certain objects being identified as intersections, object is at least one of enhanced and updated using the currently detected profile, wherein profiles are only stored if they fall within an area that is determined to contain at least one of the intersections.

* * * * *